US012755993B2

(12) United States Patent
Lee et al.

(10) Patent No.: US 12,755,993 B2
(45) Date of Patent: Oct. 6, 2026

(54) HUMIDIFIER LEAK DIAGNOSIS SYSTEM AND METHOD FOR A FUEL CELL SYSTEM

(71) Applicants: HYUNDAI MOTOR COMPANY, Seoul (KR); KIA CORPORATION, Seoul (KR)

(72) Inventors: Jun Su Lee, Gwangju-si (KR); Jong Gyun Kim, Yongin-si (KR); Min Gu Park, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 138 days.

(21) Appl. No.: 18/663,954

(22) Filed: May 14, 2024

(65) Prior Publication Data

US 2025/0192206 A1 Jun. 12, 2025

(30) Foreign Application Priority Data

Dec. 7, 2023 (KR) ........................ 10-2023-0176912

(51) Int. Cl.
*H01M 8/0438* (2016.01)
*H01M 8/04119* (2016.01)
(Continued)

(52) U.S. Cl.
CPC ... *H01M 8/04686* (2013.01); *H01M 8/04126* (2013.01); *H01M 8/04395* (2013.01); *H01M 8/04559* (2013.01); *H01M 8/04753* (2013.01)

(58) Field of Classification Search
CPC ...... G01N 1/28; G01N 27/026; G01N 27/221; G01N 2011/0066; G01N 2011/0073; G01N 2011/008; G01N 2011/0086; G01N 2011/0093; G01R 27/26; G01R 27/2617; G01R 31/12
See application file for complete search history.

(56) References Cited

U.S. PATENT DOCUMENTS 8,445,147 B2 5/2013 Jahnke
9,153,828 B2 * 10/2015 Lebzelter .......... H01M 8/04492
(Continued)

FOREIGN PATENT DOCUMENTS

JP 2002231283 A 8/2002
JP 2002352839 A 12/2002
(Continued)

*Primary Examiner* — Tung X Nguyen

(74) *Attorney, Agent, or Firm* — Lempia Summerfield Katz LLC

(57) ABSTRACT

A humidifier leak diagnosis system for a fuel cell system includes a fuel cell stack. The humidifier leak diagnosis system also includes an air supply system including at least one of an air compressor, a humidifier, an air cutoff valve, or an air pressure control valve. The humidifier leak diagnosis system additionally includes a controller configured to enter a humidifier leak diagnosis mode based on an inlet air pressure of the fuel cell stack. The controller is also configured to determine whether or not humidifier leak has been generated based on an output or an output voltage of the fuel cell stack generated through adjustment of at least one of an opening degree of the air cutoff valve or an opening degree of the air pressure control valve in humidifier leak diagnosis.

11 Claims, 3 Drawing Sheets

(51) Int. Cl.

| | |
|---|---|
| ***H01M 8/04537*** | (2016.01) |
| ***H01M 8/04664*** | (2016.01) |
| ***H01M 8/04746*** | (2016.01) |

(56) References Cited

U.S. PATENT DOCUMENTS

| | | | | |
|---|---|---|---|---|
| 9,397,354 | B2 * | 7/2016 | Keskula ............ | H01M 8/04753 |
| 9,917,316 | B2 | 3/2018 | Kim | |
| 10,593,972 | B2 | 3/2020 | Kim | |
| 2010/0216039 | A1 | 8/2010 | Jahnke | |
| 2017/0077530 | A1 | 3/2017 | Kim | |
| 2018/0269500 | A1 | 9/2018 | Kim | |

FOREIGN PATENT DOCUMENTS

| | | | |
|---|---|---|---|
| JP | 2005149897 | A | 6/2005 |
| JP | 2007265956 | A | 10/2007 |
| JP | 2010107122 | A | 5/2010 |
| KR | 20110125657 | A | 11/2011 |
| KR | 101694056 | B1 | 1/2017 |
| KR | 102506848 | B1 | 3/2023 |

* cited by examiner

HUMIDIFIER LEAK DIAGNOSIS SYSTEM AND METHOD FOR A FUEL CELL SYSTEM

CROSS-REFERENCE TO THE RELATED APPLICATION

This application claims the benefit of and priority to Korean Patent Application No. 10-2023-0176912, filed on Dec. 7, 2023, the disclosure of which is incorporated herein by reference in its entirety.

TECHNICAL FIELD

The present disclosure relates to a humidifier leak diagnosis system and method for a fuel cell system.

BACKGROUND

A fuel cell system is an electric power generation system configured to cause a reaction of high-purity hydrogen stored in a high-pressure tank with oxygen in air, thereby generating electric power. For appropriate power generation, it is necessary to adjust the condition of air introduced from outside. To this end, an air filter configured to filter out foreign matter in air may be typically provided.

In addition, air supplied to the fuel cell system should be maintained at an appropriate humidity in order to enable a fuel cell stack to generate required electric power. To this end, a humidifier configured to adjust humidity of air may be provided at an air supply system of the fuel cell system.

A plurality of hollow fiber membranes is disposed in an interior of the humidifier. When a part of the hollow fiber membranes is broken, a part of air sucked into the humidifier may not be introduced into the fuel cell stack while passing through the broken hollow fiber membranes and, as such, may again exit to outside.

In this case, the amount of air introduced into the fuel cell stack may be insufficient. As a result, a required output of the fuel cell stack may not be satisfied. When leakage of air from the humidifier continues, power generation performance of the fuel cell stack may be continuously reduced due to an increase in voltage deviation of unit cells constituting the fuel cell stack.

In conventional cases, diagnosing leakage (leak) of a humidifier is typically not performed. For this reason, a poor state of a humidifier may be erroneously recognized as failure of a fuel cell stack. In this case, there may be a problem in that a fuel cell stack in a normal state is replaced with a new one. Although the fuel cell stack is replaced with a new one, the poor state of the humidifier is maintained. Accordingly, there is a problem in that poor output of the fuel cell stack is continuously generated.

The matters described in this Background section are intended merely to enhance understanding of the general background of the present disclosure. Therefore, the Background section should not be taken as an acknowledgement or any form of suggestion that the matters form prior art already known to a person having ordinary skill in the art to which the present disclosure pertains.

SUMMARY

The present disclosure has been made in view of the above problems. An object of the present disclosure is to provide a humidifier leak diagnosis system and method for a fuel cell system capable of determining whether or not there is a humidifier leak in the fuel cell system.

In accordance with an aspect of the present disclosure, a humidifier leak diagnosis system for a fuel cell system is provided. The humidifier leak diagnosis system includes a fuel cell stack. The humidifier leak diagnosis system also includes an air supply system including at least one of an air compressor, a humidifier, an air cutoff valve, or an air pressure control valve. The humidifier leak diagnosis system further includes a controller configured to enter a humidifier leak diagnosis mode based on an inlet air pressure of the fuel cell stack. The controller is further configured to determine whether or not a humidifier leak has been generated based on an output or an output voltage of the fuel cell stack generated through adjustment of at least one of an opening degree of the air cutoff valve or an opening degree of the air pressure control valve in humidifier leak diagnosis.

The controller may be configured to set a reference pressure for humidifier leak diagnosis based on at least one of a speed of the air compressor, an opening degree of the air cutoff valve, or an opening degree of the air pressure control valve. The controller may be configured to enter the humidifier leak diagnosis mode when the inlet air pressure of the fuel cell stack is measured to be lower than the reference pressure for humidifier leak diagnosis.

The controller may be configured to accumulate a number of times when the inlet air pressure of the fuel cell stack is measured to be lower than the reference pressure for humidifier leak diagnosis. The controller may be configured to diagnose that a humidifier leak has been generated when the number of accumulated times is equal to or greater than a reference number of accumulated times.

The controller may be configured to perform additional humidifier leak diagnosis when an output voltage of the fuel cell stack is maintained to be lower than a reference output voltage for a reference time or more under a condition that i) the air cutoff valve is opened to a first opening degree and ii) the air pressure control valve is opened to a second opening degree or to be closed.

The controller may be configured to not enter the humidifier leak diagnosis mode for a predetermined time when the output voltage of the fuel cell stack is equal to or higher than the reference output voltage under a condition that i) the air cutoff valve is opened to the first opening degree and ii) the air pressure control valve is opened to the second opening degree or to be closed.

The controller may be configured to open the air cutoff valve stepwise in the additional humidifier leak diagnosis. The controller may further be configured to derive an average of deviations of output voltages of the fuel cell stack generated upon the stepwise opening of the air cutoff valve. The controller may be configured to diagnose that a humidifier leak has been generated when the output deviation average is less than a reference average.

The controller may be configured to enter the humidifier leak diagnosis mode additionally taking into consideration at least one of an output of the fuel cell stack or a state of health (SoH) of the fuel cell stack.

The controller may be configured to set a reference pressure for humidifier leak diagnosis based on at least one of a speed of the air compressor, an opening degree of the air cutoff valve, or an opening degree of the air pressure control valve. The controller may be configured to enter the humidifier leak diagnosis mode when i) the inlet air pressure of the fuel cell stack is measured to be lower than the reference pressure for humidifier leak diagnosis and ii) the output of the fuel cell stack is equal to or lower than a reference output.

The controller may be configured to set a reference pressure for humidifier leak diagnosis based on at least one of a speed of the air compressor, an opening degree of the air cutoff valve, or an opening degree of the air pressure control valve. The controller may be configured to enter the humidifier leak diagnosis mode when i) the inlet air pressure of the fuel cell stack is measured to be lower than the reference pressure for humidifier leak diagnosis and ii) the SoH of the fuel cell stack is equal to or higher than a reference SoH.

The controller may be configured to, in response to determining that a humidifier leak has been generated, control the air cutoff valve to be maximally opened, and determine a degree of humidifier leak in accordance with an output of the fuel cell stack generated in the maximally opened state of the air cutoff valve.

In accordance with another aspect of the present disclosure, a humidifier leak diagnosis method for a fuel cell system is provided. The humidifier leak diagnosis method includes measuring, by a controller, an inlet air pressure of a fuel cell stack. The humidifier leak diagnosis method also includes entering, by the controller, a humidifier leak diagnosis mode based on the inlet air pressure. The humidifier leak diagnosis method additionally includes determining, by the controller, whether or not a humidifier leak has been generated based on an output or an output voltage of the fuel cell stack generated when the controller adjusts at least one of an opening degree of an air cutoff valve or an opening degree of an air pressure control valve upon diagnosing humidifier leak.

Measuring the inlet air pressure of the fuel cell stack may include setting a reference pressure for humidifier leak diagnosis based on at least one of a speed of an air compressor, an opening degree of the air cutoff valve, or an opening degree of the air pressure control valve. Entering the humidifier leak diagnosis mode may include entering the humidifier leak diagnosis mode when the inlet air pressure of the fuel cell stack is measured to be lower than the reference pressure for humidifier leak diagnosis.

Determining whether or not a humidifier leak has been generated may include performing, by the controller, additional humidifier leak diagnosis when an output of the fuel cell stack is maintained to be lower than a reference output voltage for a reference time or more under a condition that i) the air cutoff valve is opened to a first opening degree and ii) the air pressure control valve is opened to a second opening degree or to be closed.

Determining whether or not a humidifier leak has been generated may include opening the air cutoff valve stepwise in the additional humidifier leak diagnosis, deriving an average of deviations of output voltages of the fuel cell stack generated upon the stepwise opening of the air cutoff valve, and diagnosing that a humidifier leak has been generated when the output deviation average is less than a reference average.

The humidifier leak diagnosis method may further include measuring, by the controller, at least one of an output of the fuel cell stack or a state of health (SoH) of the fuel cell stack before the measuring an inlet air pressure of the fuel cell stack.

BRIEF DESCRIPTION OF THE DRAWINGS

The above and other objects, features and other advantages of the present disclosure should be more clearly understood from the following detailed description taken in conjunction with the accompanying drawings, in which.

DETAILED DESCRIPTION

Figure 1:
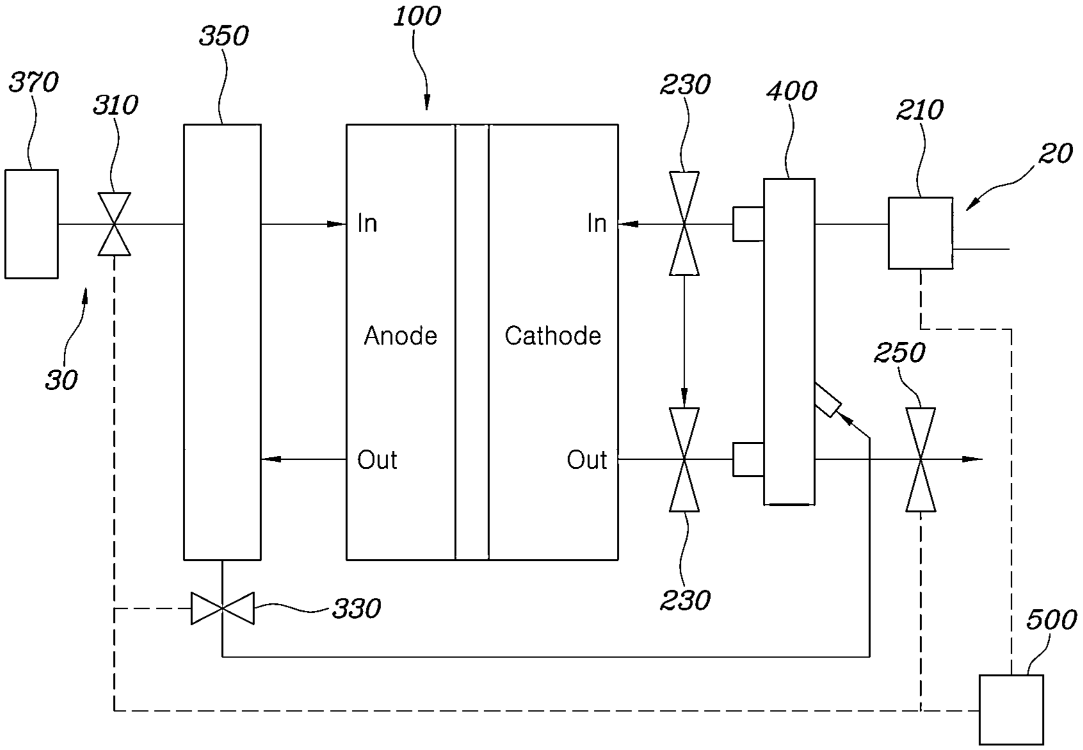
FIG. 1 is a configuration diagram of a humidifier leak diagnosis system for a fuel cell system, according to an embodiment of the present disclosure.

Hereinafter, embodiments of the present disclosure are described in detail with reference to the accompanying drawings. In the accompanying drawings, the same or similar elements are designated by the same reference numerals and redundant description thereof is omitted from the following description.

In the following description, where it was determined that a specific description of a well-known function or configuration may obscure the gist of the present disclosure, a detailed description thereof has been omitted. Embodiments of the present disclosure should be more clearly understood from the accompanying drawings. However, the present disclosure should not be limited by the accompanying drawings. It should be appreciated that all changes, equivalents, and substitutes that do not depart from the spirit and technical scope of the present disclosure are encompassed in the present disclosure.

It should be understood that, although the terms "first," "second," etc. may be used herein to describe various elements, these elements are be limited by these terms. These terms are only used to distinguish one element from another.

Unless clearly used otherwise, singular expressions include a plural meaning.

In the present disclosure, each of phrases such as "A or B", "at least one of A and B", "at least one of A or B", "A, B or C", "at least one of A, B and C", "at least one of A, B or C" and "at least one of A, B, or C, or a combination thereof" may include any one or all possible combinations of the items listed together in the corresponding one of the phrases.

In the preset disclosure, the term "comprising," "including," or the like, is intended to express the existence of the characteristic, the numeral, the step, the operation, the element, the part, or the combination thereof. Such terms do not exclude the possibility of presence of another characteristic, numeral, step, operation, element, part, or any combination thereof, or any addition thereto.

The controller may include a communication device configured to communicate with another controller or a sensor for control of a function to be performed thereby, a memory configured to store an operating system, logic commands, input/output information, etc., and at least one processor configured to execute discrimination, calculation, determination, etc. required for control of the function to be performed.

When a component, device, element, or the like of the present disclosure is described as having a purpose or performing an operation, function, or the like, the component, device, or element should be considered herein as being "configured to" meet that purpose or perform that operation or function.

FIG. 1 is a configuration diagram of a humidifier leak diagnosis system for a fuel cell system, according to an embodiment of the present disclosure.

Referring to FIG. 1, the fuel cell system may include an air supply system 20 configured to supply air to a cathode of a fuel cell stack 100. The fuel cell system may also include a hydrogen supply system 30 configured to supply hydrogen to an anode of the fuel cell stack 100.

The air supply system 20 may include at least one of an air compressor 210, a humidifier 400, an air cutoff valve 230, or an air pressure control valve 250, or any combination thereof. The hydrogen supply system 30 may include at least one of a hydrogen tank 370, a hydrogen supply valve 310, an ejector 350, or a hydrogen purge valve 330, or any combination thereof.

A controller 500 may determine, based on an inlet air pressure of the fuel cell stack 100, whether or not entrance to a humidifier leak diagnosis mode is required. In order to measure the inlet air pressure of the fuel cell stack 100, a pressure sensor configured to measure a pressure of air introduced into the cathode may be provided at a cathode inlet of the fuel cell stack 100.

The inlet air pressure of the fuel cell stack 100 may be adjusted in accordance with a speed of the air compressor 210, an opening degree of the air cutoff valve 230, and an opening degree of the air pressure control valve 250. A data map as to an estimated value or an experimental value of an inlet air pressure of the fuel cell stack 100 according to a speed of the air compressor 210, an opening degree of the air cutoff valve 230, and an opening degree of the air pressure control valve 250 may be stored in the controller 500.

When an actual value of an inlet air pressure of the fuel cell stack 100 is smaller than an estimated value or an experimental value of the inlet air pressure of the fuel cell stack 100 stored in the controller 500, this may indicate that there is a leak in the humidifier 400.

Accordingly, when the actual value of the inlet air pressure of the fuel cell stack 100 is smaller than the estimated value or experimental value of the inlet air pressure of the fuel cell stack 100, the controller 500 may enter a humidifier leak diagnosis mode.

When the controller 500 enters the humidifier leak diagnosis mode, the controller 500 may adjust at least one of an opening degree of the air cutoff valve 230 and/or an opening degree of the air pressure control valve 250. The controller 500 may then determine whether nor not there is a leak in the humidifier 400 based on an output voltage of the fuel cell stack 100 generated in accordance with the opening degree adjustment.

Generally, when a humidifier leak is generated, the amount of air introduced into the fuel cell stack 100 is decreased. In this case, accordingly, it is expected that an output of the fuel cell stack 100 or an output voltage of the fuel cell stack 100 is lower than a desired value.

Accordingly, the controller 500 may determine that a leak has been generated in the humidifier 400 in response to determining that an output of the fuel cell stack 100 or an output voltage of the fuel cell stack 100 is lower than an output of the fuel cell stack 100 or an output voltage of the fuel cell stack 100 estimated after adjustment of at least one of an opening degree of the air cutoff valve 230 and/or an opening degree of the air pressure control valve 250 and adjustment of a speed of the air compressor 210.

There are a variety of embodiments in which it is determined whether or not a leak has been generated in the humidifier 400 based on measurement of an output of the fuel cell stack 100 or an output voltage of the fuel cell stack 100. Hereinafter, an embodiment as to conditions for entrance to a humidifier leak diagnosis mode and diagnosis of leak of the humidifier 400 is described in more detail.

When a speed of the air compressor 210, an opening degree of the air cutoff valve 230, and an opening degree of the air pressure control valve 250 are determined, an estimated value or an experimental value of an air pressure at the cathode inlet of the fuel cell stack 100 may be obtained, and a data map thereof may be stored in the controller 500. Accordingly, such a value may be set as a reference pressure for humidifier leak diagnosis and, as such, the reference pressure may be set as conditions for entrance to the humidifier leak diagnosis mode.

For example, when the speed of the air compressor 210 is adjusted to 20,000 RPM, the opening degree of the air cutoff valve 230 is adjusted to 10°, and the opening degree of the air pressure control valve 250 is adjusted to 0°, the cathode inlet pressure of the fuel cell stack 100 may be about 20 kPa. Accordingly, this pressure may be set as a reference pressure for humidifier leak diagnosis under the condition that the speed of the air compressor 210 is adjusted to 20,000 RPM, the opening degree of the air cutoff valve 230 is adjusted to 10°, and the opening degree of the air pressure control valve 250 is adjusted to 0°.

When an actual value of the cathode inlet pressure of the fuel cell stack 100 is lower than 20 kPa under the condition that the speed of the air compressor 210 is adjusted to 20,000 RPM, the opening degree of the air cutoff valve 230 is adjusted to 10°, and the opening degree of the air pressure control valve 250 is adjusted to 0°, this situation is a situation in which leak of the humidifier 400 is suspected. Accordingly, entrance to the humidifier leak diagnosis mode may be carried out.

The controller 500 may accumulate the number of times when the inlet air pressure of the fuel cell stack 100 is measured to be lower than the reference pressure for humidifier leak diagnosis. When the controller 500 enters the humidifier leak diagnosis mode, the controller 500 may identify the number of accumulated times when the inlet air pressure of the fuel cell stack 100 is measured to be lower than the reference pressure for humidifier leak diagnosis. The controller 500 may then diagnose that a leak has been generated in the humidifier 400 when the identified number of accumulated times is equal to or greater than a reference number of accumulated times.

When the number of accumulated times when the inlet air pressure of the fuel cell stack 100 is measured to be lower than the reference pressure for humidifier leak diagnosis is smaller than the reference number of accumulated times, the controller 500 may measure an output or output voltage of the fuel cell stack 100, thereby diagnosing whether or not a leak has been generated in the humidifier 400.

In an embodiment, upon performing humidifier leak diagnosis for the humidifier 400, the controller 500 may measure an output voltage of the fuel cell stack 100 after opening the air cutoff valve 230 to a first opening degree and opening the air pressure control valve 250 to a second opening degree or closing the air pressure control valve 250. The air pressure control valve 250 may be closed or slightly opened. The controller 500 may more accurately diagnose leak of the humidifier 400 by enhancing reaction sensitivity of the fuel cell stack 100 through the adjustments as described above.

In an embodiment, a data map of an output voltage of the fuel cell stack 100 estimated in accordance with opening degrees of the air cutoff valve 230 and the air pressure control valve 250 and a speed of the air compressor 210 may be stored in the controller 500. The controller 500 may diagnose that a leak has been generated in the humidifier 400 in response to determining that an actually-measured output voltage of the fuel cell stack 100 is lower than an output voltage of the fuel cell stack 100 estimated in accordance with opening degrees of the air cutoff valve 230 and the air pressure control valve 250 and a speed of the air compressor 210 through identification in the data map.

In more detail, an output voltage of the fuel cell stack 100, which may be identified in the data map, may be set as a reference output voltage. Accordingly, the controller 500 may diagnose that a leak has been generated in the humidifier 400 when an output voltage of the fuel cell stack 100 is maintained to be lower than the reference output voltage, for a reference time or more, under the same condition.

Figure 2:
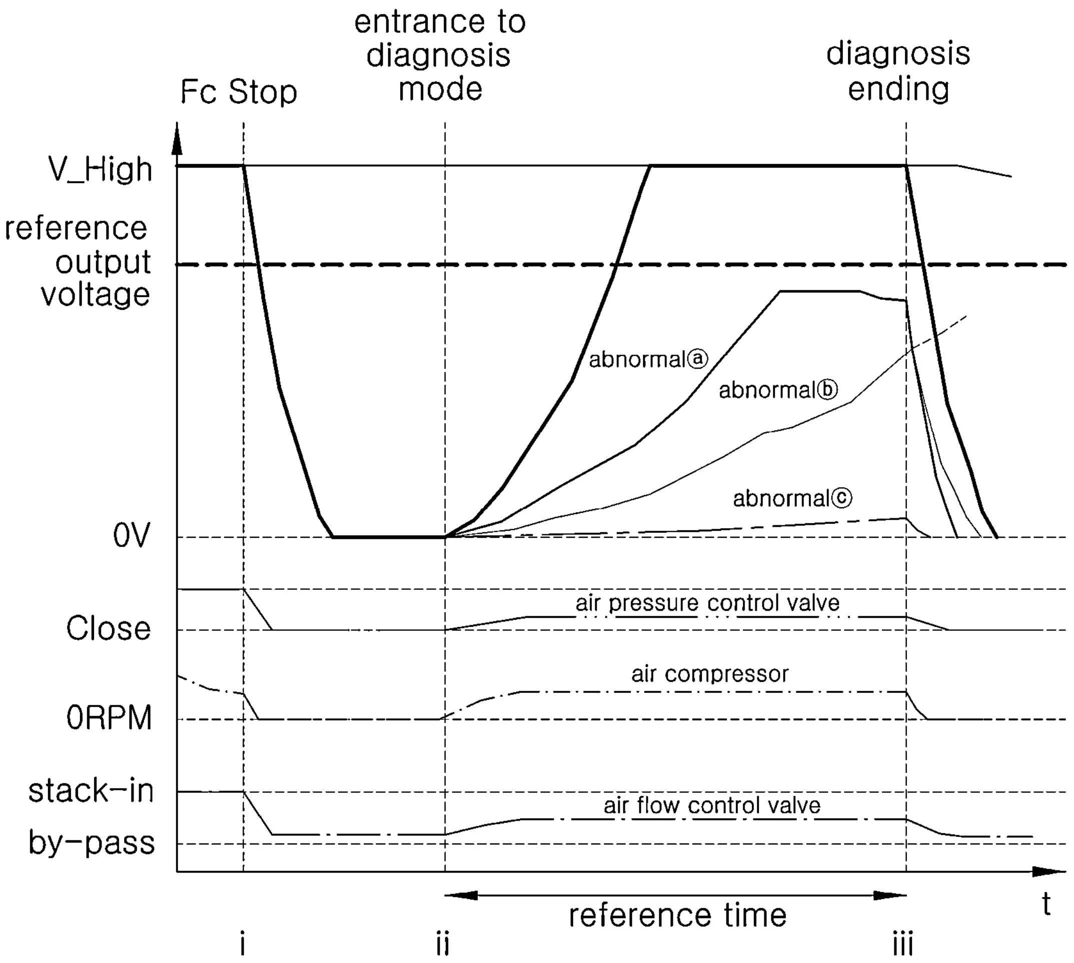
FIG. 2 is graph explaining humidifier leak diagnosis of a fuel cell system, according to an embodiment of the present disclosure.

FIG. 2 is a graph explaining humidifier leak diagnosis of the fuel cell system, according to an embodiment of the present disclosure. Referring to FIG. 2, the controller 500 may control the fuel cell stack 100 to be in a stop mode (Fc Stop), for humidifier leak diagnosis (a point in time i). When the fuel cell stack 100 enters the stop mode, driving of the air compressor 210 is stopped, and the air pressure control valve 250 and the air cutoff valve 230 are closed. After a sufficient time elapses from entrance of the fuel cell stack 100 to the stop mode, the output voltage of the fuel cell stack 100 is lowered to 0V. Subsequently, the controller 500 may enter the humidifier leak diagnosis mode (a point in time ii).

When the controller 500 enters the humidifier leak diagnosis mode, the controller 500 may control the air cutoff valve 230 to be opened to the first opening degree. The controller 500 may also control the air pressure control valve 250 to be opened to the second opening degree. The controller 500 may further control a speed of the air compressor 210.

The controller 500 may set a reference output voltage based on opening degrees of the air cutoff valve 230 and the air pressure control valve 250 and a speed of the air compressor 210. The controller 500 may then monitor an output voltage generated from the fuel cell stack 100 in accordance with lapse of time.

When the humidifier 400 is in a normal state, the monitored output voltage may approximate to the reference output voltage or may exceed the reference output voltage and, as such, may increase to a voltage limit. However, when the humidifier 400 is in an abnormal state due to generation of a humidifier leak, the output voltage may not reach the reference output voltage.

For example, referring to FIG. 2, an abnormal ⓐ state shows results in which, although an increase in output voltage is smooth because generation of a humidifier leak is not severe, the output voltage increase is stopped at a value not reaching the reference output voltage.

An abnormal ⓑ state shows results in which introduction of air into the fuel cell stack is delayed due to generation of a humidifier leak and, as such, voltage increase is also delayed.

An abnormal ⓒ state shows results in which an amount of air introduced into the fuel cell stack is very insufficient due to a severe humidifier leak situation and, as such, failure of voltage increase occurs.

When an abnormal state in which an output voltage of the fuel cell stack 100 is lower than the reference output voltage is detected for a reference time or more, the controller 500 may determine that a leak has been generated in the humidifier 400. The controller 500 may then end humidifier leak diagnosis for the humidifier 400 (a point in time iii).

On the other hand, when the output voltage of the fuel cell stack 100 generated during humidifier leak diagnosis for the humidifier 400 is equal to or higher than the reference output voltage, the controller 500 may not determine that there is a leak of the humidifier 400. In this case, the air pressure of the fuel cell stack 100 may be measured to be insufficient due to various causes not associated with the humidifier 400, for example, failure of the pressure sensor, failure of the air compressor 210, etc.

Accordingly, when the output voltage of the fuel cell stack 100 is equal to or higher than the reference output voltage, the controller 500 may determine that a reversible degradation generation state of the fuel cell system that is removable has been generated. In this case, the controller 500 may be configured to not enter the humidifier leak diagnosis mode for a predetermined time.

In another example, the controller 500 may diagnose leak of the humidifier 400 through an output of the fuel cell stack 100. For example, the controller 500 may set different opening ranges of the air cutoff valve 230. In accordance with each set opening range, the controller 500 may open the air cutoff valve 230 and measure an output of the fuel cell stack 100 generated in the set opening range.

The controller 500 may calculate an average of output deviations between adjacent opening ranges, and may diagnose that a leak has been generated in the humidifier 400 when the calculated average is less than a reference average.

For example, a minimum opening degree of the air cutoff valve 230 may be 0°, a maximum opening degree of the air cutoff valve 230 may be 45°, and the controller 500 may divide an opening range into ranges of 0 to 10°, 10 to 25°, 25 to 30°, and 30 to 45°. The controller 500 may measure an output of the fuel cell stack 100 in all 4 ranges for the same time.

Thereafter, the controller 500 may measure an average of output deviations between adjacent opening ranges For example, the controller 500 may measure an output deviation in the range of 0 to 10°, an output deviation in the range of 10 to 25°, an output deviation in the range of 25 to 30°, and an output deviation in the range of 30 to 45°. The controller 500 may then calculate an average of the output deviations. When the calculated average is less than the reference average, the controller 500 may diagnose that a leak has been generated in the humidifier 400.

For example, when a smooth increase in output is not achieved in spite of gradual opening of the air cutoff valve, is the controller 500 may determine that there is a leak in the humidifier 400.

In an embodiment, the controller 500 may enter the humidifier leak diagnosis mode, taking into consideration an output of the fuel cell stack 100 and a state of health (SoH) of the fuel cell stack 100 in addition to the inlet air pressure of the fuel cell stack 100. A most direct influence occurring when a leak is generated in the humidifier 400 is that an output lower than a required output of the fuel cell stack 100 is continuously generated during operation of the fuel cell stack 100.

Of course, the reason why the output of the fuel cell stack 100 cannot reach a required output may be due to degradation caused by degradation, flooding, etc. of a catalyst layer in the fuel cell stack 100. In order to determine whether or not an insufficient output of the fuel cell stack 100 is caused by degradation of the fuel cell stack 100, a SoH of the fuel cell stack 100 may be taken into consideration.

For example, a reference pressure for humidifier leak diagnosis for the humidifier 400 may be set based on at least one of a speed of the air compressor 210, an opening degree of the air cutoff valve 230, or an opening degree of the air pressure control valve 250, or a combination thereof. When the inlet air pressure of the fuel cell stack 100 is measured to be lower than the reference pressure for humidifier leak diagnosis, and the output of the fuel cell stack 100 is equal to or lower than a reference output, the controller 500 may enter the humidifier leak diagnosis mode for the humidifier 400.

In an embodiment, a data map of an output estimated in accordance with an opening degree of the air cutoff valve 230, an opening degree of the air pressure control valve 250, and a speed of the air compressor 210 may be stored. Accordingly, the controller 500 may adjust an opening degree of the air cutoff valve 230, an opening degree of the air pressure control valve 250, and a speed of the air compressor 210 in order to trace a required output of the fuel cell stack 100 in accordance with the data map.

In an embodiment, the controller 500 may set a current required output of the fuel cell stack 100 as the reference output. When an actual output of the fuel cell stack 100 does not meet the reference output a predetermined number of times or for a predetermined time even though the controller 500 adjusts the opening degree of the air cutoff valve 230, the opening degree of the air pressure control valve 250, and the speed of the air compressor 210 in order to trace the reference output, the controller 500 may determine that the output of the fuel cell stack 100 is equal to or lower than the reference output.

Furthermore, when the inlet air pressure of the fuel cell stack 100 is measured to be lower than the reference pressure, the controller 500 may enter the humidifier leak diagnosis mode.

In addition, the controller 500 may determine whether or not the controller 500 should enter the humidifier leak diagnosis mode by measuring a SoH of the fuel cell stack 100. For example, the SoH of the fuel cell stack 100 may be expressed by numerical values of 0 to 100. In a state in which manufacture of the fuel cell stack 100 is completed, the fuel cell stack 100 has a SoH of 100 and, as such, may exhibit performance of 100%. This performance may be referred to as birth of life (BoL).

When the fuel cell stack 100 exhibits 50 to 60% of BoL due to the use thereof and degradation caused by the use thereof, this performance may be referred to as end of life (EoL) of the fuel cell stack 100. Here, EoL refers a situation in which the fuel cell stack 100 should be replaced.

In some cases, output degradation of the fuel cell stack 100 may not result from a leak in the humidifier 400, but may result from degradation of the fuel cell stack 100 itself. Thus, the controller 500 may measure a SoH of the fuel cell stack 100. When the inlet air pressure of the fuel cell stack 100 is measured to be lower than the reference pressure under the condition that the SoH of the fuel cell stack 100 is equal to or higher than a reference SoH, the controller 500 may enter the humidifier leak diagnosis mode.

The reference SoH may be a numerical value corresponding to the EoL of the fuel cell stack 100.

In an embodiment, upon determining that a leak has been generated in the humidifier 400, the controller 500 may maximally open the air cutoff valve 230. The controller 500 may then determine a leak degree of the humidifier 400.

For example, the controller 500 may determine a leak degree of the humidifier 400 by comparing an output generated in a maximally opened sate of the air cutoff valve 230 with the data map of an output estimated in accordance with an opening degree of the air cutoff valve 230, an opening degree of the air pressure control valve 250, and a speed of the air compressor 210.

In response to determining that a leak has been generated in the humidifier 400, the controller 500 may drive the air compressor 210 at a speed higher than a speed of the air compressor 210 included in the data map in order to trace a required output of the fuel cell stack 100. The controller 500 may also generate an alarm in order to encourage the user to obtain inspection services for the humidifier 400.

Figure 3:
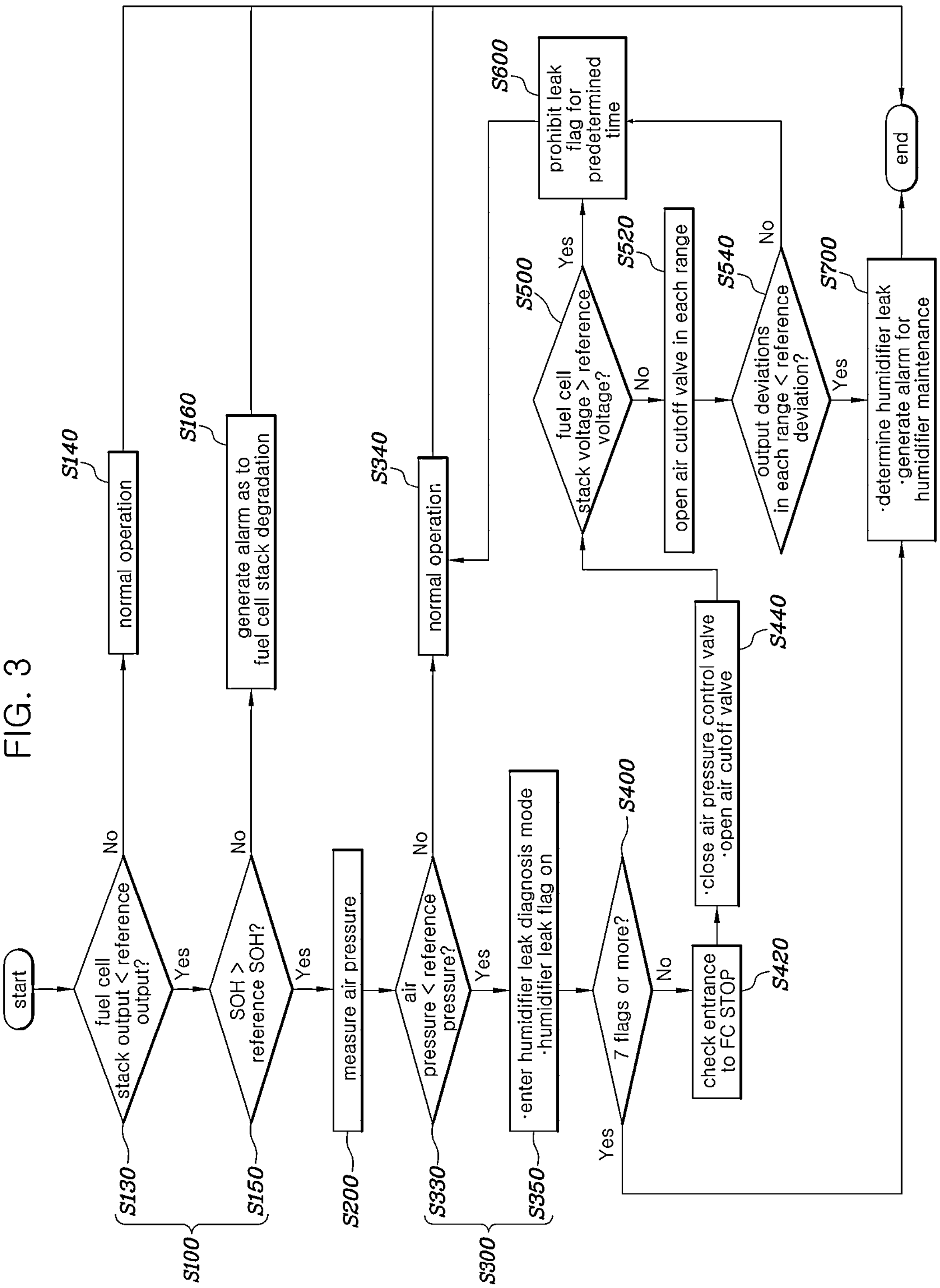
FIG. 3 is a flowchart of a humidifier leak diagnosis method for a fuel cell system, according to an embodiment of the present disclosure.

FIG. 3 is a flowchart of a humidifier leak diagnosis method for the fuel cell system, according to an embodiment of the present disclosure.

Referring to FIG. 3, in an operation S200, the controller 500 may measure an inlet air pressure of a fuel cell stack 100. In an operation S300, the controller 500 may enter a humidifier leak diagnosis mode for the humidifier 400 based on the measured air pressure, and may determine whether or not a leak has been generated in the humidifier 400 based on an output voltage of the fuel cell stack 100 or an output of the fuel cell stack 100 generated when the controller 500 adjusts at least one of an opening degree of the air cutoff valve 230 and/or an opening degree of the air pressure control valve 250 upon diagnosing leak of the humidifier 400.

When measuring, by the controller 500, the inlet air pressure of the fuel cell stack 100 in the operation S200, the controller 500 may set a reference pressure for humidifier leak diagnosis based on at least one of a speed of the air compressor 210, an opening degree of the air cutoff valve 230, or an opening degree of the air pressure control valve 250, or a combination thereof.

Thereafter, the controller 500 may measure the inlet air pressure of the fuel cell stack 100 in the operation (S200), and, in an operation S330, the controller 500 may then determine whether or not the inlet air pressure of the fuel cell stack 100 is measured to be lower than the reference pressure for humidifier leak diagnosis. Based on results of the determination, the controller 500 may enter the humidifier leak diagnosis mode for the humidifier 400 in an operation S350. In addition, the controller 500 may set a humidifier leak flag.

When the inlet air pressure of the fuel cell stack is determined to be lower than the reference pressure for humidifier leak diagnosis, the controller 500 may enter the humidifier leak diagnosis mode for the humidifier 400 in an operation S350. When determination of the inlet air pressure of the fuel cell stack to be lower than the reference pressure for humidifier leak diagnosis is accumulated in an operation S400, for example, 7 times or more, the controller 500 may determine generation of leak in an operation S700.

On the other hand, when the inlet air pressure of the fuel cell stack is recovered to the reference pressure for humidifier leak diagnosis or more under the condition that the leak flag is set, the controller 500 may perform additional leak sensing.

In additionally determining whether or not a leak has been generated in the humidifier 400, the controller 500 may control the fuel cell stack 100 to generate an output voltage in an operation S440 by controlling the air cutoff valve 230 to be opened to a first opening degree while controlling the air pressure control valve 250 to be opened to a second opening degree in a power generation stop state of the fuel cell stack in an operation S420. When the generated output voltage of the fuel cell stack 100 is maintained to be lower than a reference output voltage for a reference time or more, the controller 500 may determine that a leak has been generated in the humidifier 400 in an operation S500. If not, the controller 500 may stop leak sensing for a predetermined time in an operation S600.

In another embodiment, in additionally determining whether or not a leak has been generated in the humidifier 400, the controller 500 may set opening ranges of the air cutoff valve 230, may open the air cutoff valve 230 in accordance with the set opening ranges, and may measure an output voltage of the fuel cell stack 100 generated in each of the opening ranges in an operation S520. When it is determined in an operation S540 that an average of output deviations between adjacent ones of the opening ranges is less than a reference average, the controller 500 may diagnose that a leak has been generated in the humidifier 400.

When it is diagnosed that a leak has been generated in the humidifier 400, an alarm may be generated to encourage the user to obtain replacement or maintenance services for the humidifier 400 in the operation S700.

In an embodiment, the humidifier leak diagnosis method may further include measuring, by the controller 500, at least one of an output of the fuel cell stack 100 or a SoH of the fuel cell stack 100, before measuring, by the controller 500, an inlet air pressure of the fuel cell stack 100 in the operation S200.

The controller 500 may measure an output of the fuel cell stack 100 or a SoH of the fuel cell stack 100 in an operation S100 before measuring an inlet air pressure of the fuel cell stack 100 in the operation S200. When an output of the fuel cell stack 100 equal to or higher than a reference output is generated, the controller 500 may determine a current operation state of the fuel cell stack 100 to be a normal operation state and, as such, power generation may be continuously performed.

When the output of the fuel cell stack 100 is lower than the reference output, the controller 500 may immediately measure an inlet air pressure of the fuel cell stack 100 in the operation S200 or may immediately measure a SoH of the fuel cell stack 100 in an operation S150.

When the SoH of the fuel cell stack 100 is lower than a reference SoH, the controller 500 may determine output lowering of the fuel cell stack 100 caused by degradation of the fuel cell stack 100, and may then generate an alarm to encourage the user to obtain replacement or maintenance services for the humidifier 400.

When the SoH of the fuel cell stack 100 is equal to or higher than the reference SoH, the controller 500 may measure an inlet air pressure of the fuel cell stack 100 in the operation S200 in order to determine whether or not the controller 500 should enter the humidifier leak diagnosis mode for the humidifier 400.

As should be apparent from the above description, in accordance with the humidifier leak diagnosis system and method for the fuel cell system according to embodiment of the present disclosure, it may be possible to determine whether or not there is a humidifier leak in the fuel cell system.

Although embodiments of the present disclosure have been disclosed for illustrative purposes, those having ordinary skill in the art should appreciate that various modifications, additions and substitutions are possible, without departing from the scope and spirit of the disclosure. in the scope of the present disclosure is defined by the accompanying claims and their equivalents.

What is claimed is:

1. A humidifier leak diagnosis system for a fuel cell system, the humidifier leak diagnosis system comprising:

a fuel cell stack;

an air supply system comprising at least one of an air compressor, a humidifier, an air cutoff valve, or an air pressure control valve; and a controller configured to set a reference pressure for humidifier leak diagnosis based on at least one of a speed of the air compressor, an opening degree of the air cutoff valve, or an opening degree of the air pressure control valve, enter a humidifier leak diagnosis mode based on an inlet air pressure of the fuel cell stack, wherein the controller is configured to enter the humidifier leak diagnosis mode when the inlet air pressure of the fuel cell stack is measured to be lower than the reference pressure for humidifier leak diagnosis, and determine whether or not a humidifier leak has been generated based on an output or an output voltage of the fuel cell stack generated through adjustment of at least one of an opening degree of the air cutoff valve or an opening degree of the air pressure control valve in humidifier leak diagnosis, wherein the controller is configured to perform additional humidifier leak diagnosis when an output voltage of the fuel cell stack is maintained to be lower than a reference output voltage for a reference time or more under a condition that i) the air cutoff valve is opened to a first opening degree and ii) the air pressure control valve is opened to a second opening degree or to be closed.

2. The humidifier leak diagnosis system according to claim 1, wherein the controller is configured to:

accumulate a number of times when the inlet air pressure of the fuel cell stack is measured to be lower than the reference pressure for humidifier leak diagnosis; and diagnose that a humidifier leak has been generated, when the number of accumulated times is equal to or greater than a reference number of accumulated times.

3. The humidifier leak diagnosis system according to claim 1, wherein the controller is configured to not enter the humidifier leak diagnosis mode for a predetermined time when an output voltage of the fuel cell stack is equal to or higher than a reference output voltage under a condition that i) the air cutoff valve is opened to a first opening degree and ii) the air pressure control valve is opened to a second opening degree or to be closed.

4. The humidifier leak diagnosis system according to claim 1, wherein the controller is configured to:

open the air cutoff valve stepwise in the additional humidifier leak diagnosis, derive an average of deviations of output voltages of the fuel cell stack generated upon the opening of the air cutoff valve, and diagnose that a humidifier leak has been generated when the average of deviations of output voltages is less than a reference average.

5. The humidifier leak diagnosis system according to claim 1, wherein the controller is configured to enter the humidifier leak diagnosis mode further based on at least one of an output of the fuel cell stack or a state of health (SoH) of the fuel cell stack.

6. The humidifier leak diagnosis system according to claim 5, wherein the controller is configured to:

set a reference pressure for humidifier leak diagnosis based on at least one of a speed of the air compressor, an opening degree of the air cutoff valve, or an opening degree of the air pressure control valve, and enter the humidifier leak diagnosis mode when i) the inlet air pressure of the fuel cell stack is measured to be lower than the reference pressure for humidifier leak diagnosis and ii) the output of the fuel cell stack is equal to or lower than a reference generated output.

7. The humidifier leak diagnosis system according to claim 5, wherein the controller is configured to:

set a reference pressure for humidifier leak diagnosis based on at least one of a speed of the air compressor, an opening degree of the air cutoff valve, or an opening degree of the air pressure control valve; and enter the humidifier leak diagnosis mode when i) the inlet air pressure of the fuel cell stack is measured to be lower than the reference pressure for humidifier leak diagnosis and ii) the SoH of the fuel cell stack is equal to or higher than a reference SoH.

8. The humidifier leak diagnosis system according to claim 1, wherein, the controller is configured to, in response to determining that a humidifier leak has been generated, control the air cutoff valve to be maximally opened, and determine a degree of humidifier leak based on an output of the fuel cell stack generated in the maximally opened state of the air cutoff valve.

9. A humidifier leak diagnosis method for a fuel cell system, the humidifier leak diagnosis method comprising:

setting, by a controller, a reference pressure for humidifier leak diagnosis based on at least one of a speed of an air compressor, an opening degree of an air cutoff valve, or an opening degree of an air pressure control valve;

measuring, by the controller, an inlet air pressure of a fuel cell stack;

entering, by the controller, a humidifier leak diagnosis mode based on the inlet air pressure, including entering the humidifier leak diagnosis mode when the inlet air pressure of the fuel cell stack is measured to be lower than the reference pressure for humidifier leak diagnosis; and determining, by the controller, whether or not a humidifier leak has been generated based on an output or an output voltage of the fuel cell stack generated when the controller adjusts at least one of an opening degree of an air cutoff valve or an opening degree of an air pressure control valve upon diagnosing humidifier leak, wherein determining whether or not a humidifier leak has been generated includes performing, by the controller, additional humidifier leak diagnosis when an output of the fuel cell stack is maintained to be lower than a reference output voltage for a reference time or more under a condition that i) the air cutoff valve is opened to a first opening degree and ii) the air pressure control valve is opened to a second opening degree or to be closed.

10. The humidifier leak diagnosis method according to claim 9, wherein determining whether or not a humidifier leak has been generated includes:

opening, by the controller, the air cutoff valve stepwise in the additional humidifier leak diagnosis, deriving, by the controller, an average of deviations of output voltages of the fuel cell stack generated upon the opening of the air cutoff valve, and diagnosing, by the controller, that a humidifier leak has been generated when the average of deviations of output voltages is less than a reference average.

11. The humidifier leak diagnosis method according to claim 9, further comprising measuring, by the controller, at least one of an output of the fuel cell stack or a state of health (SoH) of the fuel cell stack before measuring the inlet air pressure of the fuel cell stack.

* * * * *